United States Patent [19]

Sibley

[11] E Re. 30,986

[45] Reissued Jun. 29, 1982

[54] VITAL RELAY DRIVER HAVING CONTROLLED RESPONSE TIME

[75] Inventor: Henry C. Sibley, Adams Basin, N.Y.

[73] Assignee: General Signal Corporation, Stamford, Conn.

[21] Appl. No.: 163,759

[22] Filed: Jun. 27, 1980

Related U.S. Patent Documents

Reissue of:

[64] Patent No.: 4,181,849
Issued: Jan. 1, 1980
Appl. No.: 873,574
Filed: Jan. 30, 1978

[51] Int. Cl.[3] ..... G07C 11/00

[52] U.S. Cl. ..... 235/92 T; 235/92 DP; 307/116; 364/900

[58] Field of Search ..... 235/92 T, 92 ST, 92 PD, 235/92 DP, 92 CT; 361/197; 307/116, 293; 364/119, 200 MS File, 900 MS File

[56] References Cited

U.S. PATENT DOCUMENTS

| | | | |
|---|---|---|---|
| 3,566,368 | 2/1971 | De Blauw | 364/200 |
| 3,723,975 | 3/1973 | Kurtz et al. | 364/900 |
| 4,080,575 | 3/1978 | Shigenobu | 235/92 T |
| 4,102,492 | 7/1978 | Gold et al. | 235/92 CT |
| 4,161,027 | 7/1979 | Russell | 364/119 |
| 4,167,786 | 9/1979 | Miller et al. | 364/119 |

*Primary Examiner*—Joseph M. Thesz
*Attorney, Agent, or Firm*—Milton E. Kleinman; John F. Ohlandt

[57] ABSTRACT

A vital relay driver whose response time can be readily controlled such that the release time of the relay may be varied, yet may be held to very close tolerances. The vital relay driver is controlled by a microprocessor dedicated to this function, such processor generating a dynamic signal of fixed frequency in dependence on a cycle number which is continually replenished; otherwise the microprocessor stops producing the dynamic signal and the relay is released in a closely known time.

11 Claims, 4 Drawing Figures

VITAL RELAY DRIVER HAVING CONTROLLED RESPONSE TIME

Matter enclosed in heavy brackets [ ] appears in the original patent but forms no part of this reissue specification; matter printed in italics indicates the additions made by reissue.

BACKGROUND OF THE INVENTION

The present invention pertains to signalling or communication sub-systems and particularly to such systems such as track circuits, speed governors and vital communication links which function to control a vital relay whose contacts are utilized in so-called vital circuits.

As background for the present invention reference may be made to sub-systems of the type described in U.S. Pat. No. 3,955,125, assigned to the assignee of the present invention, involving signalling or communication circuits adapted to be used with railroad tracks or the like for insuring fail-safe performance in the operation of certain critical control devices. Such sub-systems include the operation of a vital or fail-safe relay driver functioning to control a vital relay, which relay is so designed that when there is failure of current, the relay acts to open its contacts so as to insure a safe action. In other words, in the given sub-systems the vital relay is normally energized so long as a safe situation obtains, but this relay will be released without fail when the situation becomes unsafe. These sub-systems generally operate in a cyclic manner so that a finite time is required to determine if the situation is indeed safe. The vital relay when energized must remain energized during the time that the system is making a new determination of safety. As long as the safe situation continues, the relay remains energized with no interruptions. However, as soon as an unsafe situation is discovered, the relay must be released quickly.

A fundamental problem exists in the situation present, for example, in the case of vehicle headways where, if the release time of the relay is not held to close tolerance, its worst case maximum time must be considered in safety design, thereby imposing a penalty on the involved vehicle headway. Moreover, in certain kinds of communication systems, it is desirable to be able to select the vital relay release time so as to be appropriate for the given bit rate, channel noise and response time requirements of the system. For example, in a speed governor, it is very desirable to be able to select a short release time when the vehicle speed is high, but to be able to lengthen that release time when the speed measurement requires a greater time interval for measurement and a fast response time is not required.

Vital relay drivers currently employed, one of which may be appreciated by reference to the aforesaid patent, operate to rectify a dynamic signal, often of a very low frequency, and to filter the resultant direct current with large capacitors. Such capacitors are almost invariably electrolytic in nature, they have large tolerances, and they become less effective at very low temperatures. Also, the relay drivers are generally required to operate from an unregulated battery power supply. Consequently, the capacitor values are chosen to insure that the relay does not release falsely when the temperature is at its lowest extreme and the battery voltage has dropped to its minimum. In actual use, the temperature is generally moderate and the batteries are fully charged producing the longest possible response time.

Accordingly, as a result of the aforenoted drawbacks and disadvantages, it turns out that it is not easy to change the response or release time of these vital drivers as conditions warrant. In addition there is the expense of vitally switching components in and out of the circuit.

It is therefore a primary object of the present invention to provide a vital relay driver which has flexibility with respect to the release times that can be selected to suit varying conditions, such release or sustain times being held to close tolerances by means of digital techniques.

The above objects are distinguished from those fulfilled, for example, by the features specifically detailed in U.S. Pat. No. 3,794,834 in which an automatic vehicle control system is described for controlling the operation of a vehicle from a set of parallel operating computers in a central control station, and in which a data communication link transmits vehicle performance reports from the vehicle to the central control station and transmits vehicle command messages from the central control station to the vehicle.

The important distinguishing point to be emphasized with relation to U.S. Pat. No. 3,794,834 is that, contrasted with that system or arrangement, the present invention involves a vital relay driver which does not determine whether or not the relay should be driven, such determination being made elsewhere, in the form of vital message decoders or speed governors, or the like. The vital relay driver's sole function is to enforce the decision that has been made on the relay. Also in the aforenoted U.S. Pat. No. 3,794,834, release times of any relays are determined by hardware parameters and could not be changed by a computer program.

SUMMARY OF THE INVENTION

The primary feature of the present invention resides in the combination of a vital relay driver and its controlled relay, such driver being controlled by a microprocessor dedicated dedicated precisely to this function. Specifically, the miroprocessor generates a dynamic signal of fixed frequency, which can, for example, be approximately 12 kHz, by alternately setting and resetting an output bit every fifth instruction cycle. The dynamic output will continue until a predetermined number of output cycles have been generated sufficient to produce the desired relay energization or "sustain" time. The particular number of output cycles is determined by the coded instruction input to the processor from the system or sub-system controlling the relay driver. As long as the system is detecting a safe situation, the result is that the cycle number is produced often enough so that the processor does not run out of cycles. However, when the system stops replenishing the cycle number, the processor stops producing the dynamic signal. Consequently, the relay is released in the desired closely known time because little filtering is required for the high frequency drive signal, and only a millisecond or so is required to input the cycle number.

Another feature of the present invention resides in the provision, based upon fail-safe design principles, of a diversity means included as part of the systems for insuring that the dynamic signal will be terminated at the time designated by the input. Specifically, the diversity means comprises the provision of an 8 bit check word and of an 8 bit complement of the check word as the controlling inputs for developing the required number of cycles for the dynamic output signal from the microprocessor.

A further feature, also based upon fail-safe design principles, is that if dynamic cycle checking, including a "back check" which serves to indicate that the vital driver is not producing a GO output signal but is simply idling.

It should also be noted that the present invention capitalizes on the principle of vital programming so as to permit the utilization of a single microprocessor in safety service.

In a specific embodiment of the diversity means already generally described, it will be understood that a particular 8 bit check word followed by its complement defines a particular response or sustain time for the vital relay. In other words, different check words are used to provide the required flexibility, these check words effectively determining different response times. Thus, the two individual inputs, that is, the check word input and the complement input, provide the diversity function necessary to guard against misreading. Each of the inputs will call up a table value from a read only memory so as to determine the required response time for the vital relay. These table values must bear a fixed relationship to each other or the program will not run. In this way it is insured that the correct sustain time for the vital relay is in fact generated by the microprocessor.

Other and further objects, advantages and features of the present invention will be understood by reference to the following specification in conjunction with the annexed drawing, wherein like parts have been given like numbers.

DESCRIPTION OF PREFERRED EMBODIMENT

Figure 1:
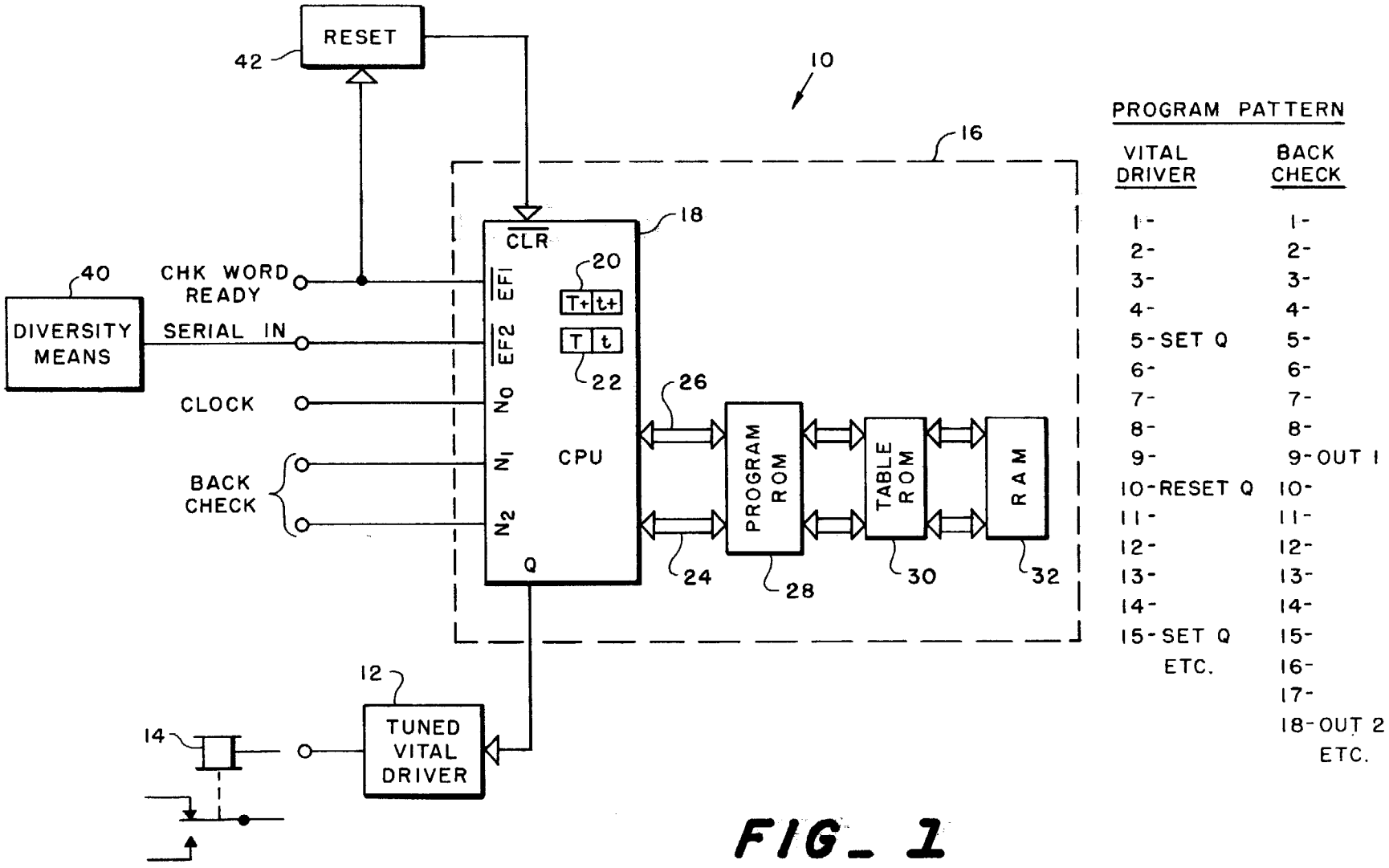
FIG. 1 is a block diagram representation of a vital driver system having controlled response time in accordance with a preferred embodiment of the invention.

Referring now to the annexed drawing, and for the moment particularly to FIG. 1, there will be seen a block diagram of the preferred embodiment of a vital driver system 10 having controlled response time. The particular implementation may be accomplished by using the RCA Cosmac 1802 microprocessor and, as will appear in certain diagrams, some of the nomenclature is keyed to this particular microprocessor. However, it will be appreciated that the system of the present invention is not limited to the microprocessor of one manufacturer and that others can be used with minor variations in circuit details and in programmed operation to allow for any differences in architecture between different manufacturing designs.

It should also be noted that the block diagram of FIG. 1 is perfectly general in that this arrangement is contemplated when the system calling for the vital relay is either not a processor or is a processor working full time on its problem. Thus, the embodiment of FIG. 1 would be used in conjunction with a speed governor of any type or with other sub-systems already noted. In certain kinds of systems, the processor may be occupied for only a fraction of its time so that the relay driver programmed operation could be carried out on the same processor.

It will be seen that in the system 10 a tuned vital driver 12 controls a vital relay 14, the function and operation of which have already been described. The tuned vital driver 12 is connected to the output Q of a microprocessor 16 comprising, in essence, a central processing unit 18 for performing arithmetic and logic operations and for providing program control. Also included and designated 20 and 22 are a pair of registers for purposes to be explained hereinafter. Connected with the central processing unit 18 over data bus 24 and address bus 26 is a programmable read only memory 28, a table read only memory 30 for special purposes to be described, and a conventional random access memory 32.

In operation of the system 10, a program pattern, as seen to the right on FIG. 1, is effectuated; that is to say, firstly, a vital driver programmed operation is achieved by alternately setting and resetting the output Q of the microprocessor 16 every fifth instruction cycle so as to provide approximately a 12 kHz signal to the vital driver 12. Additionally, a "back check" programmed operation is effectuated by the outputs designated $N_1$ and $N_2$, this operation being repeated, alternately at $N_1$ and $N_2$ every eight instruction cycle. Accordingly, while the frequency at which the signal is supplied to the vital driver is 12 kHz, the frequency supplied at $N_1$ and $N_2$ is approximately 8 kHz. This "back check" operation will be described in somewhat more detail hereafter.

A diversity means is designated 40 and the special function of this block can be provided by, for example, a vital message decoder, speed governor, or the like. In other words, the diversity means 40 is designed to provide a check word and its complement so as to insure that the system will be safe. This safe result is achieved because both the word and the complement are necessary to obtain the correct cycle numbers and these numbers must bear the correct relationship or the programmed operation cannot proceed.

It will be noted that a clock output is supplied from the CPU 18 at the terminal $N_0$ and that a reset circuit 42 is connected to a CLR terminal. In the operation of the system the check word and its complement are introduced serially using flags 1 and 2; that is to say, by means of the input terminals EF1 and EF2, as well as the clock or $N_0$ line for clocking the serial input. It should be pointed out that a parallel input port or direct memory access could be used instead if either of these other alternatives is less expensive for the particular processor that is considered for use.

Figure 2:
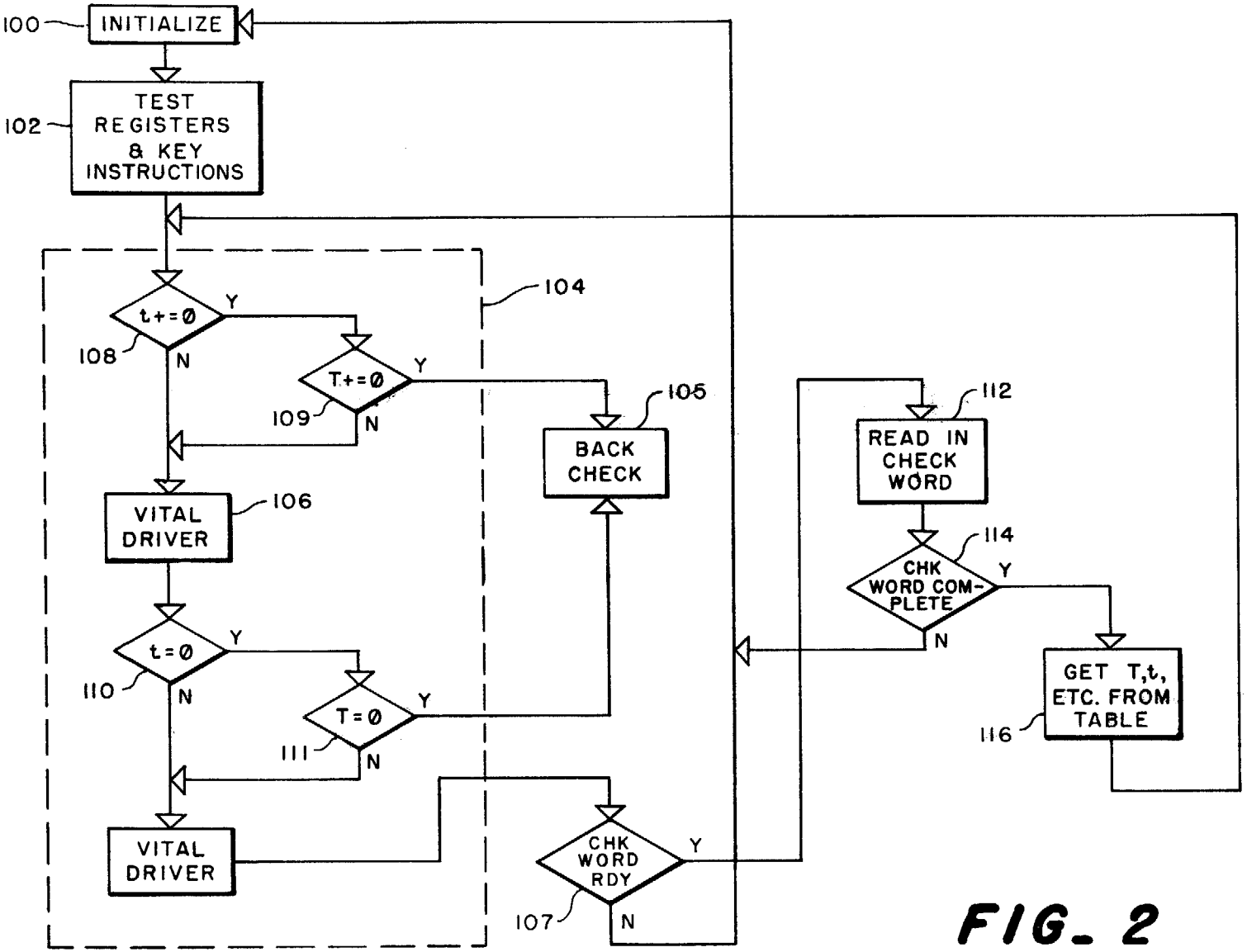
FIG. 2 is an over-view in the form of an illustrative flow chart of the key steps involved in the programmed operation for the system of the present invention.
Figure 3:
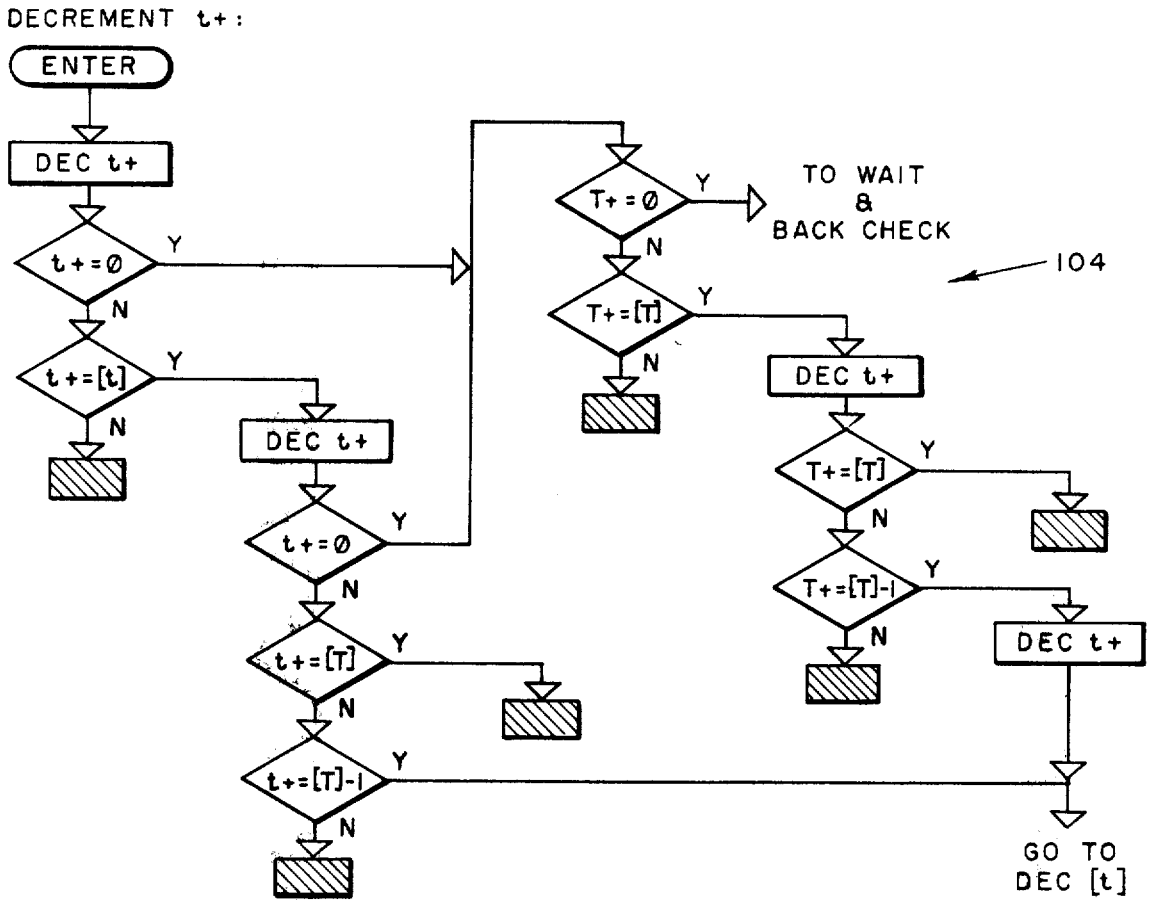
FIG. 3 is a more detailed flow chart of the programmed operation, and particularly of the portion of FIG. 2 enclosed by dotted lines.

Referring now to FIG. 2, there will be seen the key portions of the programmed operation of the vital driver system. FIG. 3 gives a more detailed view of the portion of FIG. 2 that is enclosed by the dashed lines. The flow chart of FIG. 2 describes the programmed operation; that is, the steps performed by the microprocessor in response to a program executed by the program control unit forming part of CPU 18. In block 100 the programmed operation is such as to load the various program counters, table pointers and data pointers with the proper values; also zeros are placed in registers 20 and 22 which function to determine relay sustain time. In block 102 the programmed operation is such as to test the registers for zero and to perform cycle checks on certain key instructions.

The programmed operations seen in the dahsed area 104 constitute a timing loop containing vital checks. When the relay driver 12 is on standby, the small loop involving programmed operation 105 tests the exit instructions of the vital driver programmed operation 106. It is this loop which delivers the aforenoted 8 kHz "back check" signal. Testing or checking of the flag that signifies that a check word is ready for input is accomplished by the programmed operation designated 107.

It should be noted that the diamond-shaped blocks, as conventionally employed, indicate decisional or yes/no kinds of programmed operations. One of these is the aforenoted block 107. Others such as 108, 109, 110 and 111 relate to decisions as to whether t+, T+, t, T is equal to zero, respectively.

When the check word ready flag is sensed, that is to say, when the operation designated 107 has been performed, then the check word is read in, this operation being indicated at 112 of FIG. 2. The next time the ready flag is set, the complement of the check word is read in. When this has been accomplished, the programmed operation 114 will initiate appropriate operation according to block 116, which involves getting the appropriate time numbers from a table look-up. These are the two numbers which determine the relay sustain time. As already indicated, these numbers are placed in working registers 20 and 22 and also in read/write memory, usually designated RAM.

The detailed operation is such that the check word and complement are read into a particular RAM location, each read-in displacing the previous value, such check and complement words being transferred to another register and being taken there for the actual table look-up. When the check and complement word is transferred to the appropriate register, the RAM location is then set to zero and the zero state is checked.

It should be especially noted that the relay driver cannot run, that is, cannot operate as if a safe condition exists, unless a check word and its complement are brought in often enough to replace the time numbers appearing in the registers 20 and 22 before these registers are run down to zero. It is insured that the check word and its complement are brought in often enough by the safe action provided by the diversity means 40.

Figure 4:
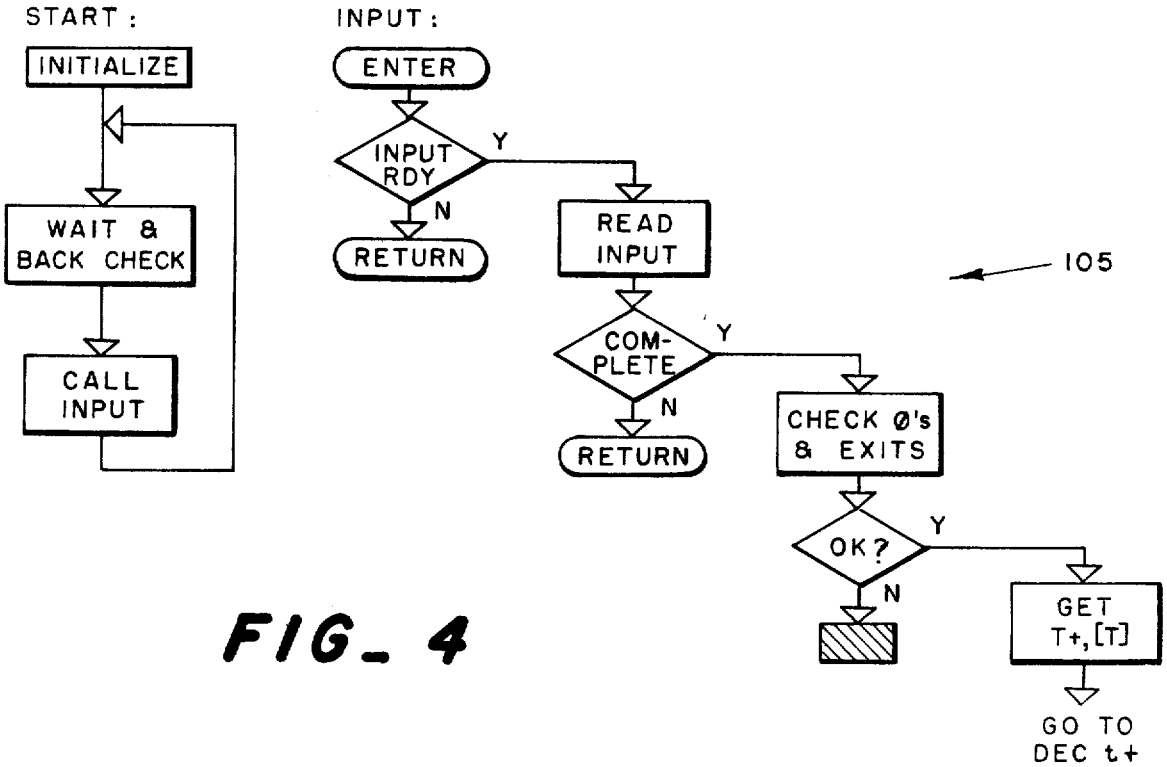
FIG. 4 is an illustrative flow chart of the back check loop programmed operation.

As has already been set forth previously, it is a crucial aspect of the operation of the vital driver 12 that the time numbers, that is, those numbers defined as T+, t+, and T, t, must be continually replenished before they run to zero. The decrementing operation will be understood by reference to FIG. 3 which is a detailed flow chart of the vital logic programmed operation. FIG. 4 is provided simply to give some detailed understanding of the back check loop which generates a dynamic signal every eighth instruction alternately at the 1 and 2 outputs previously indicated.

The reason such an involved system of checks is required is that, first of all, the input command or check word might be read incorrectly leading to a too long sustain time for relay 14. However, this problem has been overcome, as already described, by requiring both the word and its complement and using both to obtain the two time numbers indicated. These numbers must bear the correct relationship or the programmed operation cannot run.

Another hazard that must be guarded against is that the timing loop may not be exited when the time comes. The exit is by way of a branch-on-zero instruction which is cycle checked throughout the programmed operations, as seen for example in FIG. 2 and also in FIG. 3. Two such exits are provided only one of which is used in normal operation. Both of these exits are checked in the back check loop.

A further hazard that must be guarded against is that the registers 20 and 22 may not be decremented when they should be, with the result that the timing loop runs forever. With the two registers that are in operation each step of the decrementing process is checked as follows:

Assuming that the processor clock crystal frequency is 2 hHz, the timing loop seen in FIG. 3 runs in 320 microseconds. The registers 20 and 22 are decremented twice during this loop. It should be noted in this regard that the loop seen in FIG. 3 is for only the time number called by the check word, but is simply repeated for the other word, that is, for the time number called by the complement of the check word.

Each of the registers 20 and 22 is decremented twice during its particular loop so that an 8 bit number of maximum size is reduced to zero in 128 steps or 40 milliseconds.

The table reproduced below provides the correspondence between particular coded instructions and the table values that are employed for obtaining the two "time" numbers, as well as a listing of the corresponding relay sustain times in seconds.

| CODED INSTR. | | TABLE VALUE | SUSTAIN TIME |
|---|---|---|---|
| 0070 | T+ | 00 | .040 sec. |
| 1 | | 01 | .080 |
| 2 | | 03 | .160 |
| 3 | | 07 | .320 |
| 4 | | 0B | .480 |
| 5 | | 0F | .640 |
| 6 | | 13 | .800 |
| 7 | | 18 | 1.00 |
| 8 | | 31 | 2.00 |
| 9 | | 4A | 3.00 |
| A | | 63 | 4.00 |
| B | | 7C | 5.00 |
| C | | 95 | 6.00 |
| D | | AE | 7.00 |
| E | | C7 | 8.00 |
| F | | E0 | 9.00 |
| 0080 | T | E0 | 9.00 |
| 1 | | C7 | 8.00 |
| 2 | | AE | 7.00 |
| 3 | | 95 | 6.00 |
| 4 | | 7C | 5.00 |
| 5 | | 63 | 4.00 |
| 6 | | 4A | 3.00 |
| 7 | | 31 | 2.00 |
| 8 | | 18 | 1.00 |
| 9 | | 13 | .800 |
| A | | 0F | .640 |
| B | | 0B | .480 |
| C | | 07 | .320 |
| D | | 03 | .160 |
| E | | 01 | .080 |
| F | | 00 | .040 |

As will be appreciated, a unit increment is 0.040 seconds; therefore, in the case of the first two table values 00 and 01 the difference is 0.040 seconds; however, the difference between the table values 01 and 03 is 0.080 seconds. It will be understood that the second byte of a given number (t+ or t) serves to multiply the 40 milliseconds by any selected value up to 255 leading to a time range of between 40 milliseconds (or 320 microseconds if there is use for such a small value) up to about 10 seconds.

The time numbers as indicated are T+, t+ and T, t where the capital letters refer to the upper byte, and the lower case to the lower byte. The number T+, t+ is greater than T, t by one. When these numbers are placed in RAM, as indicated previously, they are then designated by the same symbols, but including parentheses.

When the operation is such that the time numbers in the registers 20 and 22 are being decremented by the programmed operation, then the numbers stored in RAM are used as references to check the decrementing instructions as will be further appreciated by reference to FIG. 3. At the end of each program loop, the new value of each number is transferred to RAM. Many further checks can be made comparing the register version of a number to its RAM version or to the RAm version of the second number and these comparisons can be made both before and after decrementing. In some cases, the numbers are equal and in other cases they differ by one. Each comparison is made by a subtract operation followed by a branch-on-zero. An exclusive OR operation with the value one reduces a remainder of one to zero. If a pattern of these tests is used along with the decrement instruction, the sequence when executed properly will branch sometimes and drop through at other times. Each wrong turn in the instruction sequence leads to a section of programmed operation containing several bytes of zeros, shown in FIG. 3 as boxes with hatched lines. The processor goes into the idle state if its gets a zero instruction and can be retrieved from this state only by an external reset (as configured in FIG. 1). The external reset forces the processor to the initialize routine wherein all vital registers and stores are cleared and checked to be so cleared.

What has been disclosed in accordance with the present invention is a vital relay driver controlled by a microprocessor and by an accompanying sub-system, such as a speed governor functioning to control the vital relay driver, such that the sustain or release times of the relay being controlled can be selectively varied in accordance with the circumstances encountered in the operation of the sub-system. By reason of the arrangement, the release time of the relay can be held to extremely close tolerances such that its worst case does not have to be considered in the design so as to impose a penalty on vehicle headway, yet the relay release time may be readily varied; for example, when it is desired to select a short release time in the case when vehicle speed is high, but to lengthen the release time when fast response is not required.

While there has been shown and described what is considered at present to be the preferred embodiment of the present invention, it will be appreciated by those skilled in the art that modifications of such embodiment may be made. It is therefore desired that the invention not be limited to this embodiment, and it is intended to cover in the appended claims all such modifications as fall within the true spirit and scope of the invention.

What is claimed is:

1. A system for providing a signal, *based on a time cycle* to a tuned vital driver so as selectively to hold up or sustain a vital relay, which is connected to the driver, for a variety of predetermined time intervals, *corresponding to a required number of cycles*, comprising means for selectively generating each of the predetermined time intervals, said means including a digital microprocessor having one of its outputs connected to said tuned vital driver, said microprocessor generating a dynamic signal at said one output of fixed frequency and extending for a specified time interval so long as a cycle number is being continually replenished in the microprocessor in response to the presence of a safe condition;

a diversity means connected to the input of said microprocessor for selectively supplying, in response to differing safe conditions, both a respective check word and the complement of said check word as controlling inputs of said microprocessor for developing the required number of cycles for the dynamic output signal from said processor, whereby a respective time interval is generated during which the vital relay will be sustained;

a pair of registers within said microprocessor for storing a pair of time numbers corresponding to said check word and its complement, said time numbers representing the selected time interval during which the vital relay is to be sustained;

means for continuously and repetitively decrementing the time number values in said registers;

a cycle checking means *located in said microprocessor* for continuously and repetitively checking on the programmed operations of said microprocessor.

2. Apparatus as defined in claim 1, in which a table read-only memory provides time numbers corresponding with the check word and its complement so as to determine the relay sustain time.

3. Apparatus as defined in claim 2, in which said time numbers corresponding with the check word and its complement have a predetermined relationship.

4. Apparatus as defined in claim 3, in which said time numbers differ by one.

5. Apparatus as defined in claim 2, in which said time numbers are stored in two locations, one location being in said pair of registers, the other being in a random access memory.

6. Apparatus as defined in claim 1, further including *a pair of outputs for said microprocessor, and* back check means *connected to said pair of outputs* for verifying that the time cycle is not running.

*7. A system for providing a signal, based on a time cycle, to a vital driver so as selectively to hold up or sustain a vital output for one of a variety of predetermined time intervals, corresponding to a required number of cycles, comprising:*

*means for generating the selected predetermined time interval, said means including a digital processor having one of its outputs connected to said tuned vital driver, said processor generating a dynamic signal at said one output of fixed frequency and extending for a specified time interval so long as a cycle number is being continually replenished in the processor in response to the presence of a safe condition;*

*a diversity means connected to the input of said processor for selectively supplying, in response to differing safe conditions, both a respective check word and a complement of said check word as controlling inputs of said processor for developing the required number of cycles for the dynamic output signal from said processor, whereby a respective time interval is generated during which the vital output will be sustained;*

*a pair of registers within said processor for storing a pair of time numbers corresponding to said check word and its complement, said time numbers representing the selected time interval during which the vital output is to be sustained;*

*means for continuously and repetitively changing by a predetermined amount the time number values in said registers;*

*a cycle checking means, located in said processor, for continuously and repetitively checking on the programmed operations of said processor.*

*8. Apparatus as defined in claim 7, in which a table read-only memory provides time numbers corresponding with the check word and its complement so as to determine the sustain time of the output.*

*9. Apparatus as defined in claim 8, in which said time numbers corresponding with the check word and its complement have a predetermined relationship.*

*10. Apparatus as defined in claim 7, in which said time numbers are the check words.*

*11. Apparatus as defined in claim 7, further including a pair of outputs for said processor, back check means connected to said pair of outputs for verifying that the time cycle is not running.*

* * * * *